United States Patent [19] — [11] 4,288,208
Küsters — [45] Sep. 8, 1981

[54] BELT ARRANGEMENT AND PRESS EQUIPPED THEREWITH FOR THE CONTINUOUS MANUFACTURE OF WOOD CHIPBOARD AND SIMILAR MATERIALS

[76] Inventor: Eduard Küsters, Gustav-Fünders-Weg 18, 4150 Krefeld-Forstwald, Fed. Rep. of Germany

[21] Appl. No.: 55,510

[22] Filed: Jul. 9, 1979

[51] Int. Cl.[3] .......... B29J 5/08

[52] U.S. Cl. .......... 425/371; 198/493; 198/600

[58] Field of Search .......... 425/363, 364, 365, 366, 425/367, 368, 369, 370, 371, 321; 198/493, 600; 406/88, 89

[56] References Cited

U.S. PATENT DOCUMENTS 2,779,969 2/1957 Bose .......... 425/371
3,848,536 11/1974 Chukhanov .......... 198/721
3,887,314 6/1975 Andresen .......... 425/371

*Primary Examiner*—Paul R. Michl
*Attorney, Agent, or Firm*—Kenyon & Kenyon

[57] ABSTRACT

In a belt arrangement including two endless belts revolving about deflection cylinders with their axis parallel to each other, for transporting loose, finely divided material, the upper sections of which belts are in approximately the same plane, the belts being driven in the same transport direction and following each other immediately in the transport direction and thus forming an upper wedge space between the two belts; an auxiliary device for transferring the material from one belt to the next one is obtained by means of a liquid which is of higher specific gravity than the material to be transported and does not wet the latter disposed in the upper wedge between the last deflection cylinder of the one belt and the first deflection cylinder of the following belt with seals sealing said wedge at the bottom and sides to retain the liquid.

9 Claims, 3 Drawing Figures

FIG.1
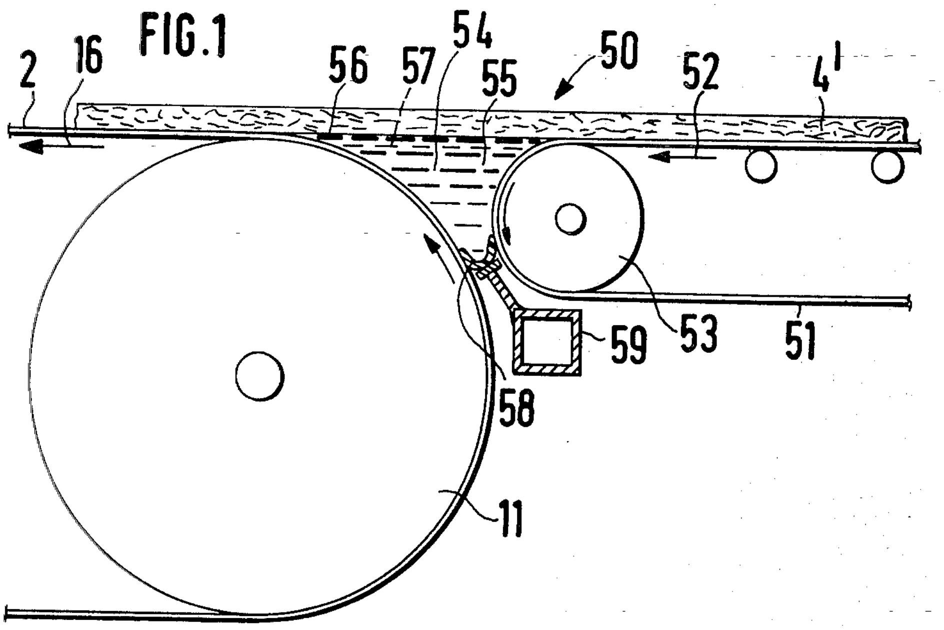
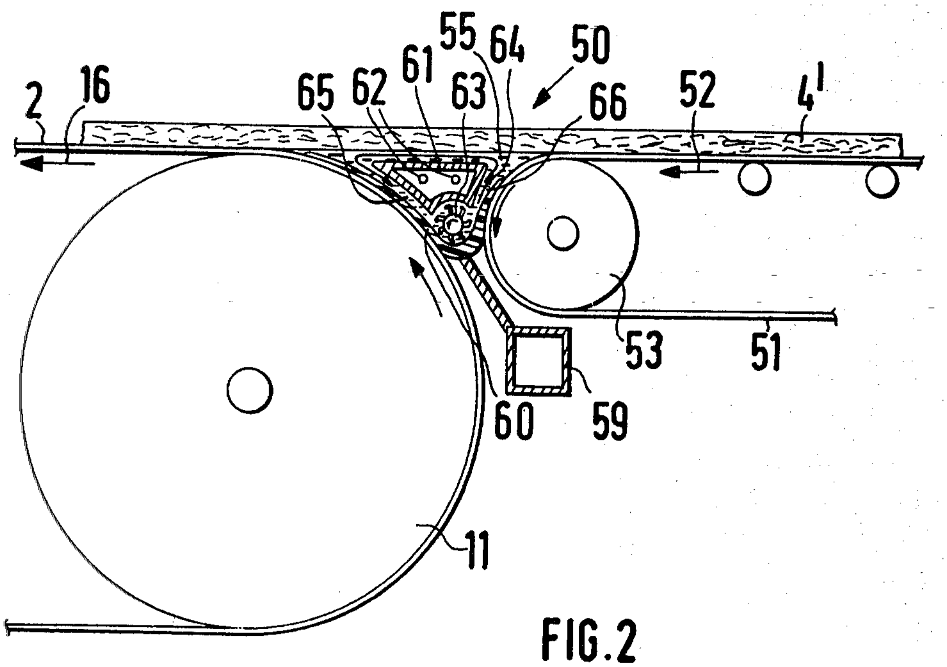
FIG.2

BELT ARRANGEMENT AND PRESS EQUIPPED THEREWITH FOR THE CONTINUOUS MANUFACTURE OF WOOD CHIPBOARD AND SIMILAR MATERIALS

BACKGROUND OF THE INVENTION

This invention relates to conveyor belts in general, and more particularly to an improved belt arrangement for feeding material to a press.

A belt arrangement having two endless belts revolving about deflection cylinders with their axes parallel to each other for transporting loose, finely divided material in which the belts have their upper sections in essentially the same plane and are driven in the same direction, one belt following the other, and which arrangement includes an auxiliary device for transferring the material from one belt to the next one, is described in German Auslegeschrift No. 22 31 802. The disclosure therein relates to a plant for the manufacture of chipboard, fiber panels and the like. This plant includes a platen press, to which a cake of fiber material containing glue for use in making the chipboard is fed by means of the belt arrangement. The auxiliary device for transferring the material from one belt to the other includes a deflection bar around which the belt is deflected with a very small radius and in which the transfer point can be brought quite close to the following belt or to the belt trays of the platen press. Such small radii are possible, of course, only with correspondingly flexible belts, for instance, of textile materials, but not with sheet metal belts.

The starting point of the present invention was a chipboard press according to DE-OS No. 21 57 746.

In this press, the web is conducted between endless forming belts which are arranged in opposed relationship one over the other. The belts co-revolve in the travel direction of the web and extend over the width of the web. Roller chains are provided which roll between the forming belts and a smooth support structure provided above and below the respective belt. The roller chains revolve in endless sequence in a plane perpendicular to the web. The overall roller arrangement is made up of a plurality of adjacent roller chains which have a width which is narrow relative to the width of the web and is constant in the forward travel direction. They thus form many closely adjacent individual strands transversely to the web, and transmit the working pressure and, if applicable, the heat from the support structure to the forming belts, as they roll. The pressing section proper corresponds to the length of the support structure. However, the lower forming belt is longer and extends from the pressing section out to a sprinkling device in which a bed of chips containing glue on the top side of the lower forming belt in the bed are sprinkled resulting in the material suitable for forming chipboard. The lower forming belt thus takes the bed which is pressed to make the board along and introduces it into the pressing section proper. In the region ahead of the pressing section, the lower forming belt therefore functions as a conveyer belt, while the pressing of the web proper takes place only in the pressing section.

The forming belts are steel belts about 1.2 mm thick. In the range in which the mass of chips is transported on the lower forming belt prior to entering the pressing section, the temperature of the lower forming belt must be low and in any case remain below 50° C. in order to avoid premature condensation of the resin on the chips, which would result in reduced strength of the chipboard. The web therefore enters the pressing section in relatively cold condition and is heated only in the latter; the heat is transferred into the web through the rollers bracing the forming belt against the support structure and through the forming belt itself.

Due to the heating of the forming belt when passing through the pressing section, the forming belt expands lengthwise according to its temperature rise. The rollers of the roller chains rolling on the forming belt are taken along in the process. However, on the other hand they are held by the contact with the support structure on the side opposite the forming belt and furthermore, by axles located their straps, so that the rollers of the roller chains cannot follow the expansion of the forming belts when they pass through the pressing section.

This results in a longitudinal stress in the link chains of the roller chains and a tendency of the rollers of the roller chains to slip through in the longitudinal direction relative to the forming belt and/or the support structure.

It is therefore desirable to avoid a temperature change of the belt arrangement as far as possible when it travels through the pressing section. Since the temperature cannot be made uniform because it must not exceed a certain value in the feed section, it is necessary to separate the belt arrangement and to use a feed belt which has only a transport function and extends up to the entrance of the pressing section, as well as the forming belt proper which can then always remain entirely in the press and have a uniform high temperature without the feed section being influenced thereby.

However, the real problem now becomes the transition from the preceding belt to the belt in the pressing section. The bed is carefully built up from different layers of different fineness and different glue content, where the finest, i.e., practically meal-fine chips are found in the outermost layers and fall through any gap in the belt arrangement. Also, if the transfer is not perfect, the build-up of the bed gets mixed up.

The design according to DE-AS No. 22 31 802, in which the belts are conducted over a sharp edge, cannot be considered for a press according to DE-OS No. 21 57 746 because the sheet metal belts used require a certain minimum radius.

SUMMARY OF THE INVENTION

It is now an object of the present invention, starting with the problems of DE-OS No. 21 57 746, to design quite generally a belt arrangement which permits as troublefree a transfer of the material transported on the belts as possible at the separation points of the succeeding belts.

According to the present invention, this problem is solved by using, as the auxiliary device for transferring the material from one belt to the next one, a liquid arranged in the upper wedge between the belts, sealed toward the bottom, between the last deflection cylinder of the preceding belt and the first deflection cylinder of the following belt, which liquid has a specific gravity higher than the material to be transported and does not wet the latter. The material is transferred from the preceding belt to the liquid level, where it does not sink in because of the higher specific gravity of the liquid, and where it is also not subjected to other influences due to swelling and the like, because the liquid does not wet the material. After crossing the liquid, the material is accepted again by the following belt at the first deflection cylinder of the latter.

It is advisable that the liquid with its level be at about the height of the upper belt cylinder.

This feature is not mandatory; the material can also be transferred to and taken from a level slightly below the crest of the deflection cylinders on both sides as long as this distance is not so large that the material slides off or tumbles around because of the slope of the support surfaces.

A circulation device for circulating to liquid in the travel direction may be provided and is important because it relieves the material of the task of having in turn to accelerate the liquid, so that the material, lying on the liquid, can be taken along by the latter and can overcome the gap between the two deflection cylinders.

This can be accomplished by disposing a displacement body and a pump in the wedge below the liquid level with the pump generating a flow of liquid around the displacement body through the space remaining between it and the adjacent boundries of the wedge. Furthermore, a temperature control device for the liquid is preferably provided in order to adapt to various temperature requirements.

In this regard, in accordance with the disclosed embodiment, the displacement body in the wedge contains cooling and or heating elements permitting such temperature control. Furthermore, as disclosed, a particularly good liquid for the purpose of the present invention is melted Wood's metal. This liquid should always be used if a particularly large difference of specific gravity of material and liquid is important. The chips for manufacturing wood chipboard have a specific gravity of approximately 1, whereas the specific gravity of melted Wood's metal is about 7 to 8. Furthermore, melted Wood's metal does not wet wood chips in any way. Another feature of the present invention resides in the combination of this belt arrangement with the aforementioned type of press in which the problems were encountered.

Essential to this combination is the arrangement of the point of separation of the belt immediately before it enters the pressing section, so that the belt in the pressing section can remain entirely within the press and the preceeding belt can be entirely outside the press, so that the temperature setting and control can be different, as is required, for instance, for manufacturing chipboard in this press.

BRIEF DESCRIPTION OF THE DRAWINGS

FIGS. 1 and 2 are partial longitudinal vertical sections through the transition region at the separation point of a belt arrangement consisting of two successive belts.

DETAILED DESCRIPTION OF THE INVENTION

Figure 3:
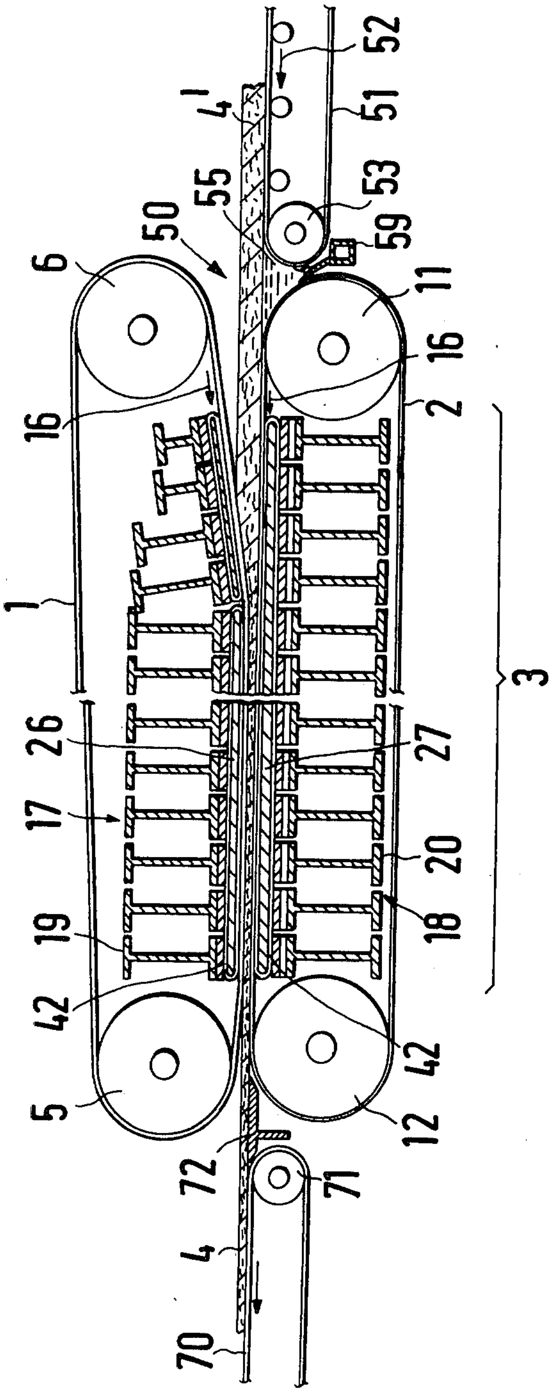
FIG. 3 shows a vertical longitudinal section through a press for the manufacture of wood chipboard, at the entrance of which the present invention is applied.

In FIG. 1, a conveyer belt 51 is shown which travels forward in the direction of the arrow 52 and is deflected by a deflection cylinder 53. The conveyer belt 51 is followed by a conveyer belt 2, which travels forward in the direction of the arrow 16 and provides the same direction of transportation as that of belt 51. The belt 2 is deflected by a deflection cylinder 11 which, in the illustrated embodiment example, has a substantially larger diameter than the deflection cylinder 53.

Between the deflection cylinders 53 and 11, which are close together, there is a separation point designated generally as 50. At the separation point 50 of the upper wedge 54, between the deflection cylinders 53 and 11, a sealed liquid space, in which a liquid 55 is contained, is formed. The liquid 55 is heavier than the material 41 to be transported. Material 41 consists of a loose bed of finely divided material, e.g., wood chips or wood fibers. In addition, the liquid 55 is chosen so that it does not wet the material.

The upper sections of the conveyer belts 51 and 2 are at the same height in the illustrated embodiment, and the liquid level 56 is also raised to this height, so that the material 4' is transferred without change of height from the upper section of the belt 51 to the level 56 of the liquid 55 and from there to the upper section of belt 2. Because of the higher specific gravity of the liquid 55 and the lack of wetting, the liquid 55 acts merely as a carrier for the material 4' across the separation point 50 and otherwise does not influence material 4'.

Depending on the kind of material, absolutely equal height of the upper sections of the belts 51 and 2 with each other and with the level 56 of the liquid 55 does not matter. The liquid can also be, for instance, somewhat below the height of the upper sections of the belts 51 and 2, as indicated by the dashed line 57. The material 4' then moves beyond the crest of the deflection cylinder 53 somewhat downward on its descending side and, after traversing the liquid 55, somewhat upward on the other side of the deflection cylinder 11, until the level of the upper section of the belt 2 is reached. It is also posisble to compensate for small height differences of the upper sections of the belts 51 and 2.

The liquid space in the upper wedge is sealed at the bottom by a lip seal 58 which rests against the two belts 51 and 2 which is arranged in about at the height of the connecting plane of the two axes of the deflection cylinders 53 and 11, and is mounted on a transversal beam 59. The seal can also be arranged further up or down; it is only important that the liquid level can be maintained approximately at the height of the upper sections of the adjacent belts 51 and 2.

It is understood that the liquid space in the wedge 54 is sealed off on both sides of the deflection cylinders 53 and 11 by suitable seals at the end faces, which are not shown.

In FIG. 2, a modification of the basic principle is shown. Corresponding parts having the same reference numerals. It includes a seal 60 which has lips which extend quite far over the circumference of the deflection cylinders 53 and 11 so that the belts 51 and 2 are kept away from the liquid 55 on their outside. In the liquid space, a displacement body 61 designed as a hollow body is arranged. In the interior of body 61 cooling or heating elements 62 are arranged which give off their heat to the liquid 55 and keep the latter at a desired temperature. On the underside of the displacement body 61, a pump wheel 63 is mounted, which extends over the width of the web. It is constructed in the manner of a finned tube and is rotated to circulate the liquid 55 in the direction of arrow 64 when it rotates in the direction of the arrow. The liquid 55 is therefore sucked in on the side facing the deflection cylinder 11 in the canal 65 remaining between the lip of the seal 60 and the opposite wall of the displacement body 61, and is pushed up again through the canal 66 which remains on the side of the deflection cylinder 53 between the seal 60 and the other side of the displacement body 61. Thereby, a flow parallel to the transport direction is obtained on the surface of the displacement body 61, so that when the material 4' is transferred from the belt 51 to the liquid 55, it tends to carry the material along and in any event, presents no resistance to the material begin taken along, so that the smooth transfer without hesitation of the material 4' is aided.

In FIG. 3, an application example of the invention in a continuous press for the manufacture of wood chipboard or the like is shown. The press comprises an upper belt 1 of steel sheet about 1 to 1.5 mm thick and a similar lower belt 2.

The upper belt 1 revolves over rolls or cylinders 5 and 6 which are arranged transversely to the web 4. Cylinder 6 is mounted in a fixed stand 7 and cylinder 5 in a stand which can be swung about an axis extending transversely to the web at a support on the floor, and which can be moved via a hydraulic actuator, so that the belt 1 is tensioned.

Similarly, the belt 2 runs over cylinders 11 and 12 which are arranged transversely to the web 4. Cylinder 11 is mounted in a stationary stand and cylinder 12 in a movable stand which can be moved by a hydraulic actuator in the lengthwise direction of the web 4, so that the belt 2 can be tensioned in this manner. The belts 1 and 2 are driven via the cylinders.

The belts 1 and 2 run through the press in the direction indicated by the arrow 16, so that the material arriving on the belt 2 on the right-hand side of FIG. 3 is drawn into the length region 3 which represents the pressing section. The finished, compressed wood chipboard web 4 emerges on the left side in FIG. 3.

In the length section 3, an upper support structure 17 is provided in the interior of the belt 1, which cooperates with a lower support structure 18 provided in the interior of the lower forming belt 2, and which support the zones of the belts 1 and 2 facing the web 4 against the web 4 and press them against a large surface with great force.

The support structures 17 and 18 each consist of individual beams 19 and 20 which are arranged opposite each other above and below the belts 1 and 2 and the web 4. Each pair of beams 19 and 20 is clamped together laterally outside the web 4, so that individual pressure members are formed which are closed in themselves force-wise. The lower beams 20 transmit their force via pressure cushions 56 which are filled with a hydraulic medium and ensure uniform exertion of the pressure over the width of the web even if the beams 19 and 20 are bent under the pressure. Between the beams 19 or the pressure cushions 56 and the belts 1 and 2 strong plates 26 and 27 which transmit the force exerted by the individual pressure members 1, 9 and 20 evenly to the belts 1 and 2 and which contain canals in which heater elements are arranged or through which a heating medium is conducted are disposed.

Between the sides of the plates 26 and 27 facing each other and the belts 1 and 2, roller chains 42 are arranged, on which the belts 1 and 2 roll relative to the plates 26 and 27 and which revolve endlessly in a vertical longitudinal plane around the plates 26 and 27. The rolls of the roller chains 42 transmit the pressure as well as the heat of the plates 26 and 27 to the belts 1 and 2 and thereby, to the web 4.

After the roller chains 42 have arrived at the end of the length section 3, they are led back in the press zone, i.e., between the beams 19 and 20 and the plates 26 and 27, so that they keep a uniform temperature and are also not exposed to dirt.

For the reasons discussed in the introduction of the specification, it is important that, on the one hand, the material 4, being fed in, which latter makes the board, is moved on a colder conveyer belt, and that on the other hand, the belt carrying the material 4' suffers no change of length due to being heated up when passing through the pressing section. For this reason, the material 4' is brought up by a preceeding belt 51 and the press belt 2 is a separate belt, having deflection cylinders 11 and 12 which are pushed as close as possible to the pressing zone 3 so that the belt 2 suffers as little temperature loss as possible and can remain at a temperature approaching the press temperature as closely as possible.

At the separation point 50, the material 4' which consists of a bed, having a composition exactly predetermined over its thickness, of wood chips and fine wood fibers, is transferred from belt 51 to belt 2. So that during the transfer, the material 4' does not fall through the gap between the deflection cylinders 53 and 11 and the bed 4' cannot tumble, disturbing its structure, a liquid 55 is contained in the wedge between the deflection cylinders 53 and 11, the relationships in detail being as was described in connection with FIGS. 1 and 2. For the application of the chipboard press, melted Wood's metal is particularly useful as the liquid 55, because the latter has a very large density difference from the mass of wood chips, does not wet the mass of wood chips and still has a melting point of permissible magnitude.

At the exit of the press, the web 4 is taken over by a conveyer belt 70. In this case, no problems arise at the transition between the deflection cylinder 12 and the first deflection cylinder 71 of the conveyer belt 70, because the web 4 is already hard. It is therefore sufficient to provide a slide plate 72 at this point.

What is claimed is:

1. In a belt arrangement including two endless belts revolving about deflection cylinders with their axis parallel to each other, for transporting loose, finely divided material, the upper sections of which belts are in approximately the same plane, said belts being driven in the same transport direction and following each other immediately in the transport direction and thus forming an upper wedge space between the two belts; and an auxiliary device for transferring the material from one belt to the next one, an improved auxiliary device comprising:

a liquid which is of higher specific gravity than the material to be transported and does not wet the latter in the upper wedge between the last deflection cylinder of the first belt and the first deflection cylinder of the following belt; and means sealing said wedge at the bottom and sides.

2. The improvement according to claim 1, wherein the level of the liquid is approximately at the height of the upper belt section.

3. The improvement according to claim 1 and further including a circulation device for circulating the liquid so that at its surface a flow direction corresponding to the transport direction is established.

4. The improvement according to claim 3, wherein said circulation device comprises a displacement body, and a pump disposed in the wedge below the liquid level said pump generating a flow of the liquid around said displacement body through the space remaining between said body and the adjacent boundaries of said wedge.

5. The improvement according to claim 4, and further including a temperature control device for the liquid.

6. The improvement according to claim 5, wherein said temperature control device comprises heat exchange elements disposed in said displacement body.

7. The improvement according to claim 6, wherein said liquid consist of melted Wood's metal.

8. The improvement according to claim 1, wherein said liquid consists of melted Wood's metal.

9. In a press for exerting contact pressure onto a longitudinal section of an advancing web, to form a pressed sheet from loose material in which the material in a web is conducted in a pressing section between endless belt arrangements which are arranged one over the other, said belts co-revolving in the forward travel direction of the web and extending over the width of the web, and in which pressure and heat are transmitted through the belts to the web the lower belt arrangement also extending in front of the pressing section and a device for applying the loose material producing the sheet to said lower belt arrangement, the improvement comprising the lower belt arrangement being divided into two belt sections immediately ahead of the entry into the pressing section and, at the point of separation of said belts an auxiliary device for transferring the material comprising:

a liquid which is of higher specific gravity than the material to be transported and does not wet the latter disposed in the upper wedge between the last deflection cylinder of the one belt and the first deflection cylinder of the following belt; and means sealing said wedge at the bottom and sides.

* * * * *